Oct. 18, 1932.    B. T. BORDEN    1,883,332
DIESTOCK
Filed April 25, 1930    2 Sheets-Sheet 2
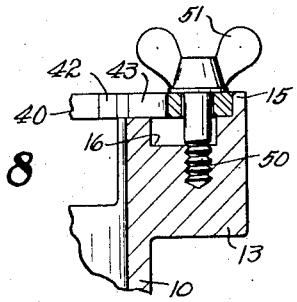
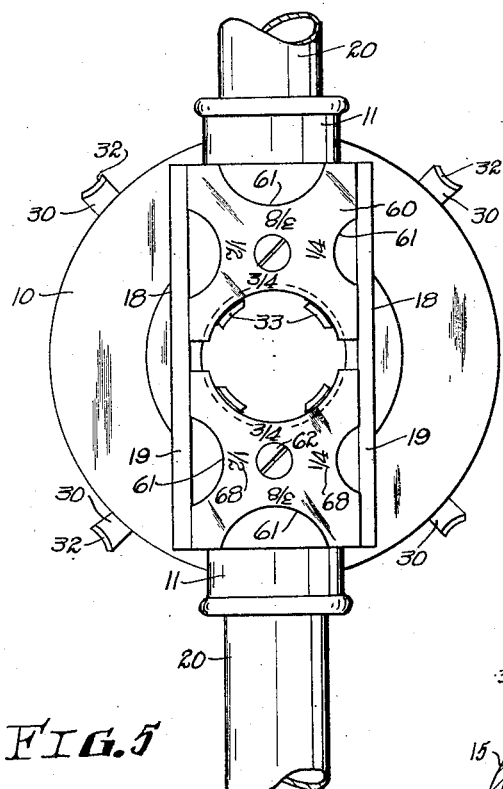
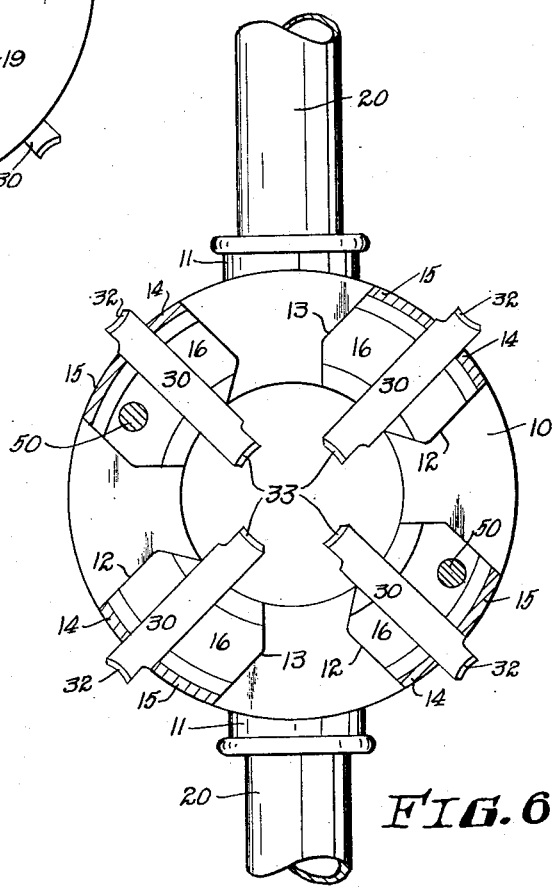
Inventor
Bradford T. Borden,
By Bates, Golrick & Team,
Attorneys Patented Oct. 18, 1932

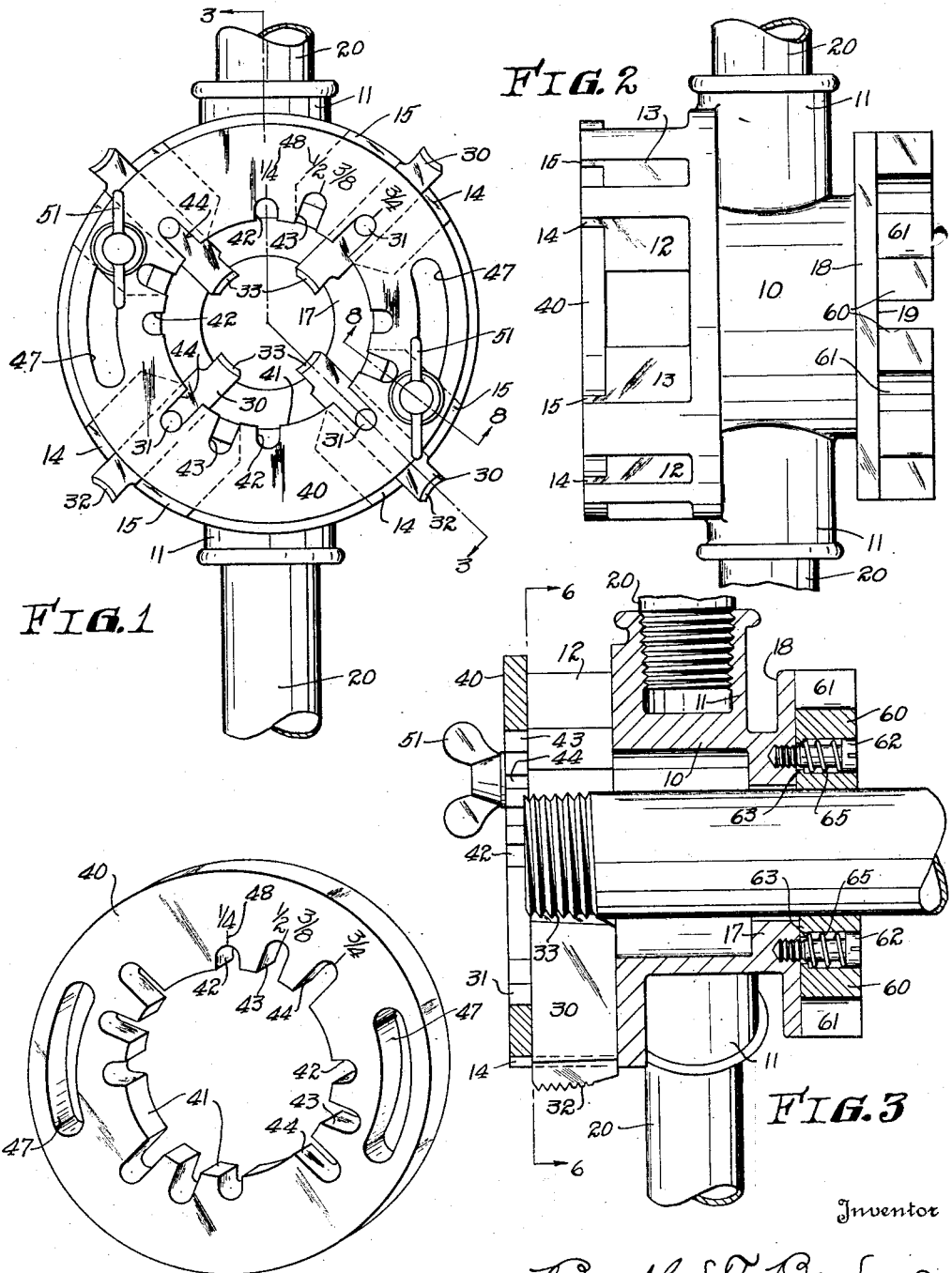

1,883,332

UNITED STATES PATENT OFFICE

BRADFORD T. BORDEN, OF LAKEWOOD, OHIO, ASSIGNOR OF ONE-HALF TO WILLIAM A. NERACHER, OF WARREN, OHIO, AND ONE-HALF TO THE BORDEN COMPANY, OF WARREN, OHIO, A CORPORATION OF OHIO

DIESTOCK

Application filed April 25, 1930. Serial No. 447,212.

This invention relates to a die stock of the type wherein the chasers remain in fixed position during the thread cutting operation. The invention is concerned particularly with means for enabling the threading of various size pipes by the same tool, by very readily effected adjustments. The tool provides a plurality of fixed positions for the chasers, and also enables the chasers to be reversed, so that, by providing cutting threads on both ends of the chasers, this plurality of sizes is doubled. Thus, in one tool, I can thread for instance a pipe of 1/4", 3/8", 1/2" and 3/4" sizes, or in a larger tool 1", 1 1/4", 1 1/2" and 2" sizes.

My die stock is illustrated in the drawings hereof, is hereinafter more fully explained, and its essential novel features are summarized in the claims.

In the drawings, Fig. 1 is a face view of a die stock; Fig. 2 is a side elevation thereof; Fig. 3 is an axial section; Fig. 4 is a perspective of the stopping plate which regulates the position of the chasers; Fig. 5 is a view of the face of the die stock opposite Fig. 1; Fig. 6 is a transverse section parallel with Fig. 1 and in a plane just beneath the stopping plate; Fig. 7 is an elevation of one of the chasers; Fig. 8 is a detail in section on the line 8—8 on Fig. 1.

The frame of my die stock comprises a suitable hollow member 10, which may be a single integral casting, carrying the thread-cutting chasers adjacent one end and the pipe guide adjacent the other. Intermediately, means are provided for rotating the frame. I have shown for this purpose the frame equipped with two diametrically opposite sockets 11 into which suitable handles 20 may extend, though any other means may be provided for rotating the frame.

On one side of its intermediate region, the frame is provided with a number of equi-distant housings for the chasers, each housing comprising a pair of parallel bosses 12 and 13 having a parallel sided recess between them.

Each recess is adapted to be occupied by a parallel sided chaser 30. On opposite sides, the chaser is slidably guided by the bosses 12 and 13, while the inner face of the chaser rests upon the frame 10 at the bottom of the housing, which in this region lies in a single plane. Each chaser 30 is formed with an upstanding lug or pin 31 which is adapted to coact with a stopping plate 40 which serves the double purpose of holding the chasers down against the frame and of limiting their outermost position.

The stopping plate 40 is of the form shown detached in Fig. 4. It has a central opening 41 of greater diameter than the largest size pipe for which the die stock is adapted, while extending laterally from this central opening are groups of notches, there being one group for each chaser and the notches in the group extending for different depths as indicated at 42, 43 and 44. Any one of these may receive and coact with the pin 31 on the chaser.

The stopping plates rest against the face of the bosses 12 and 13, and is concentrically positioned by reason of arcuate flanges 14 and 15 at the outer edges of such bosses which engage the circular periphery of the stopping plate. The stopping plate is held on the frame by a pair of screws 50 which pass through arcuate slots 47 on the stopping plate and enter a diametrically opposite pair of the frame bosses 13. These screws are shown as threaded in the frame bosses and as having wing heads 51 by which they may be readily turned manually.

When the screws 50 are turned into place the stopping plate is held rigidly on the frame and also efficiently engages the outer face of the chasers. The chasers which are in complete housings, rectangular in cross section, are thus definitely located by their pins 31 seating in the ends of one of the notches 42, 43 and 44, while the tightened stopping plate clamps them in this position.

If the die stock is set for the smallest size pipe to be threaded, the chaser pins 31 will occupy the shallowest notches 42. Now, to reset the die stock for the next larger size of pipe, it is only necessary to shove the chasers inwardly manually until their pins clear the notches 42; loosen the screws 50 by turning their heads 51, and then turn the stopping plate to present the notches 43 to pins 31; shove the chasers outwardly until their pins engage the base of the notches 43, and reclamp the plate.

The adjustment described is sufficient for two adjacent sizes of pipe, which have the same pitch for threads and may be cut by the same chaser teeth. To enable the same die stock to handle larger sizes, I form different teeth on opposite ends of the chasers 30; then by loosening the screws and raising the stopping plate, I can take the chasers out and turn them end-for-end; after which the stopping plate is restored. With a small size die stock, where there is not room to remove the chasers inwardly, the stopping plate must be raised the height of the chaser pins 31 to allow their removal. For a larger size die stock, it is only necessary to loosen the stopping plate enough to free the chasers as they may be then removed by sliding them inwardly.

The pins 31 are a short distance from the mid-region of the chasers toward the coarser teeth, so that when the chasers are reversed, the pins may still occupy the notches 43 and be suitable for the smaller one of two larger sizes of pipe. To take a still larger size, the clamping screws are loosened and the notches 44 are caused to register with the chaser pins and form the abutment therefor. Accordingly, by having the three notches and the double ended chasers, I provide for threading four sizes of pipe.

A further advantage of my tool, is that it may be very readily used for cutting a thread deeper than the standard, to provide for special fittings. This is accomplished by sliding the chasers inwardly slightly from their seats, the clamping of the chasers by the ring being sufficient to hold them during the cutting operation, even though the pins do not seat against the ends of the slots.

To prevent dirt or chips clinging in the deeper notches 43 and 45, and thus interfering with the accurate positioning of the chasers, I form arcuate grooves 16 in the top face of the bosses 12 and 13. These grooves lie below the outermost ends of these notches, and thus with a nail or similar implement, one may poke any chips or dirt in the notches down into the groove, thus maintaining the notches clear.

As shown in Fig. 6, I make the boss 13, which is on the driving side of the chaser, preferably heavier than the boss 12 on the other side, as I can economize on the weight on the advancing side without reducing the effective strength of the tool. The inner end of the boss 13 is preferably concentric of the pipe opening, while the inner end of the boss 12 is cut off at an angle for chip clearance. The widening spaces between the adjacent chaser housings allows any chips to readily pass to the outside and drop free from the die stock.

It is necessary to provide variable guiding means for the different sizes of pipe. This could be effected by making the guiding opening in the frame of a size corresponding to the larger size pipe, and providing three bushings of different thicknesses for the other three sizes. However, I prefer to employ a permanently mounted settable guide which is shown herein, but which forms the basis of a copending application of mine.

As shown, the frame 10 has on the side opposite the chaser housings, a portion 17 which has a cylindrical opening slightly larger than the largest size pipe and carries a flat rectangular extension 18 bounded by a pair of parallel ribs 19. Between these ribs, I provide a pair of square blocks 60 having on their four sides different arcuate recesses 61 forming portions of two cylinders corresponding to the exterior sides of the four sizes of pipe with which the die stock may be used. Each block is pivotally secured to the frame by a screw 62 which passes through the center of the block and is threaded in the frame portion 17. This screw has a fillister head occupying a cylindrical cavity in the block. The block has an inward shoulder 63 at the base of the cavity, and between that shoulder and the overhanging portion of the head 62 is a helical compression spring 65. The compression spring normally maintains the block seated against the frame between the ribs 19. However, by simply grasping the block by one's thumb and finger in two of the opposed recesses 61, one may pull the block outwardly until it can clear the ribs 19 and then give it a quarter turn, or a multiple thereof, to present a different recess to the die stock axis.

By employing the adjustable guide above described, I make the die stock entirely self-contained. The guide is very readily set for any size desired, and, as heretofore described, by varying the position of the stopping plate and reversing the chasers if necessary I can correspondingly set them.

Suitable marks may be provided on the face of the stopping plate to identify the size for the respective notches, as shown by the mark 48 in Fig. 4 and corresponding marking 68 may be employed on the guide blocks 60.

It will be seen that my die stock comprises very few parts, and these may be of comparatively light construction, so that I provide a tool which has the advantages of lightness, compactness, and cheapness of manufacture, and at the same time is adapted for many different sizes of pipe. While the tool in the drawing is marked for the four sizes from 1/4″ to 3/4″ inclusive, an exactly similar tool but larger may take the four sizes from 1″ to 2″ inclusive, and hence two tools will provide for all the threading operations for ordinary plumbing.

I claim:

1. In a die stock, the combination of a hollow frame having chaser guides with arcuate flanges at their outer ends, a circular stopping plate mounted within and guided by said flanges, said stopping plate having a central opening with groups of radial notches leading therefrom for various distances, chasers having shoulders adapted to abut against the ends of the notches, arcuate slots through the stopping plate, and screws passing through the stopping plate into the frame for holding said plate in various angular positions.

2. The combination of a rotary hollow frame provided with means whereby it may be rotated, said frame carrying on one side a suitable pipe guide and on the other side a plurality of pairs of lugs, each pair having between them a parallel sided recess, chasers occupying the various recesses and having projections on the edge opposite the frame, said frame lugs having at their outer edges arcuate flanges, a stopping plate having a circular contour mounted within the set of flanges, said stopping plate having a central opening and groups of notches leading therefrom, there being a group for each chaser and the notches of each group being of various depths, said notches being adapted to receive the projections on the chasers, the stopping plate being provided with diametrically opposite arcuate recesses, and screws passing through said recesses and threaded in two of the frame lugs, whereby the plate may be clamped with notches of any selected size coacting with the chaser projections.

3. The combination of a frame having chaser guides open at both ends radially, a stopping plate secured to the frame and overlying the chaser housings and having a central opening with groups of radial notches leading therefrom, the notches of each group being of various depth, and chasers having projections intermediately located and adapted to occupy different notches of the corresponding group.

4. In a die stock, the combination of a hollow frame having chaser guides with arcuate flanges at their outer ends, an annular stopping plate mounted within and guided by said flanges, said stopping plate having groups of radial notches of differing depth forming abutments adapted to coact with shoulders on the chasers.

5. In a die stock, the combination of a hollow frame having pairs of parallel projections constituting the side members of chaser housings, an annular stopping plate having a central opening, said plate extending across said projections and adapted to bear on chasers in the housings and having at its inner periphery notches of different depths communicating with the central opening and adapted to coact with intermediately located shoulders on the chasers, and means for clamping the stopping plate to the frame to bind the chasers.

6. The combination of a frame having chaser housings, a stopping plate secured to the frame and having groups of radial notches communicating with a central opening the notches of a group being of individually different depths, chasers having projecting pins intermediately located and narrower than the chasers and adapted to occupy such notches, with the body of the plate on opposite sides of the notches bearing against the top of the chasers between the pins and said central opening, and means for securing the stopping plate to the frame.

7. The combination of a frame having chaser guides, a stopping plate having a central opening and radial notches of various depths communicating with said opening, and chasers in the guides having projections intermediately located and adapted to occupy any of said notches, and means for securing the plate to the frame with the plate overlying the bodies of the chasers between the projections and the outer periphery of the plate.

In testimony whereof, I hereunto affix my signature.

BRADFORD T. BORDEN.